United States Patent Office 3,183,172
Patented May 11, 1965

3,183,172
OBTAINING PSILOCYBIN AND PSILOCIN FROM FUNGAL MATERIAL
Roger Heim, Paris, France, Albert Hofmann, Bottmingen, Basel-Land, Artur Brack, Riehen, near Basel, and Hans Kobel, Basel, Switzerland, and Roger Cailleux, Pavillons-sous-Bois, France, assignors to Sandoz Ltd., Basel, Switzerland, a Swiss firm
No Drawing. Filed Feb. 16, 1959, Ser. No. 793,234
Claims priority, application Switzerland, Feb. 21, 1958, 56,143; July 30, 1958, 62,393
21 Claims. (Cl. 195—80)

The present invention relates to psilocybin and psilocin and to the preparation thereof from the so-called hallucinogenic fungi: Psilocybe, Stropharia, Panaeolus, Conocybe, Amanita and Russula. It has heretofore been impossible to isolate the active substance from samples of the natural fungi or from artificially cultured fungal material; nor has it been possible to culture hallucinogenically active species—starting from natural fungi—under conditions that would produce active material in amounts sufficient for obtaining the active substance on a preparative scale.

A primary object of the present invention is the embodiment of an industrially feasible process whereby the hitherto unknown active principles of hallucinogenic fungal species, notably *Psilocybe mexicana* Heim, *Psilocybe caerulescens* Murrill var. *nigripes* Heim, *Psilocybe zapotecorum* Heim, *Psilocybe semperviva* Heim and Cailleux, *Psilocybe aztecorum* Heim and *Stropharia cubensis* Earle, are obtained free from halogen.

This object is realized according to the present invention by extracting the active principles either directly from the fungal material of natural origin or from cultures of the fungi or of biological variants or mutants thereof which have been grown on natural or artificial substrates by culture techniques which make it possible to obtain sufficient amounts of active material to permit the isolation of the latter on a preparative scale. Briefly stated, the cultures are incubated in daylight or in the dark at a constant temperature between 18 and 27° C. and, after purification, the active substance is separated and freed from halogen, where present.

The process, more specifically, may be carried out as follows: For a culture on a natural substrate, a compost consisting of fermented wheat straw and a mixture of corn leaves and corn stems or stalks of wild grasses is washed well under running water, poured into earthenware dishes and sterilized in an autoclave. The compost is inoculated with mycelium from primary cultures and incubated for approximately two weeks at 24–27° C. The cultures are then covered with sterile sand and left undisturbed in a glass box in the daylight at a temperature of 18–27° C., the moisture content being kept constant. The fruit bodies appear after 4 to 5 weeks. They are harvested from time to time for a period of 1 or 2 months as soon as the formation of the spores has started.

In developing an alternative process which is better adapted for large scale operation, it was found quite unexpectedly that, grown in vitro on substrates rich in nutritive material, the fungi produce active mycelium and sclerotes in large quantities and only a very small number of fruit bodies, on substrates poor in nutrients, however, the familiar fruit bodies are produced. On an agar medium containing 1.5% by weight of agar, a concentration of 0.2 to 0.7% by weight of dry substance of malt extract is the optimum for the formation of fruit bodies, whereas concentrations of 4 to 10% by weight, depending upon the particular fungal species employed, are optimal for the formation of mycelium and sclerotes.

While daylight is indispensable for the formation of fruit bodies, it has been found that sclerotes and mycelium are formed in greater profusion if the cultures are incubated in the dark. The largest yields of active fungal material (mycelium and sclerotes) are obtained by preparing surface cultures with culture media of malt extract (beerwort or commercial preparations of malt extracts) containing 4 to 10% by weight of dry substance, and by incubation of these cultures in the dark at a constant temperature between 22 and 26° C. Addition of 0.2% by weight of agar to the culture medium enhances good growth. This medium is just sufficiently firm— though it is still almost liquid—to permit the fungus to grow quickly, forming a well-knit mycelium layer. Addition of ferrous salts is very desirable; addition of zinc, potassium, calcium and magnesium salts, of nitrate, phosphate and sulphate ions as well as of yeast extract or of corn steep solids is also found to be very advantageous.

This process of cultivation is a great technical improvement, as it gives a high yield of active starting material; the yield is actually ten times greater than that obtained from a culture on natural substrates and the artificial method takes less time and involves less work.

The active fungal material (fruit bodies, sclerotes and mycelium) is carefully dried in an air current or under reduced pressure at 20–40° C., finely ground and thoroughly extracted with a lower aliphatic alcohol or with a mixture of water and a water-miscible organic solvent at room temperature (20 to 30° C.). The extracts are concentrated under reduced pressure at low temperature. The residue is defatted with petroleum ether and extracted with acetone or chloroform-alcohol to remove inactive accompanying material. Other ballast material is separated off by dissolving the residue in as little water as possible and repeated precipitation with absolute ethanol or acetone; the filtrate is concentrated under reduced pressure at low temperature.

Further purification is advantageously carried out by chromatography on cellulose powder in a through-flow process; elution is performed with water-saturated butanol or another alcohol not miscible with water. The fractions collected are tested for their content of active substance by means of the Keller reagent (glacial acetic acid containing iron chloride and concentrated sulphuric acid). The fractions showing a positive color reaction are combined and, if necessary, chromatographed again on a column of cellulose powder. From the through-flow chromatogram a rather rapidly travelling zone is eluted. This yields a product containing an active substance, "psilocin," characterized by a clear blue Keller reaction, while from a zone travelling more slowly, a product containing a second active substance, "psilocybin," is obtained in larger amounts.

The active substances are obtained in a fairly pure state from the column but contain halogen and do not crystallize out as psilocybin and psilocin. The halogen may be removed only by chemical treatment, crystalline compounds being thereby obtained. For this purpose, an aqueous solution of the active material is treated with silver carbonate or silver oxide. Excess silver ions are removed with hydrogen sulphide and the remaining solution is concentrated under reduced pressure at low temperature, the substances crystallizing out from the concentrated solution.

For analysis, psilocybin is recrystallized from methanol or water. Recrystallization from water yields very fine white needles; from methanol colorless hexagonal plates or prisms are produced; these contain methanol and melt at 195–200° C. (with decomposition). The compound dissolves in 120 parts by weight of boiling methanol or in 20 parts by weight of boiling water; it dissolves difficulty in higher alcohols and other organic solvents. The crystals are dried in a high vacuum at 100° C., a decrease in weight of 10.4% taking place. The results of elementary analysis give the empirical formula $C_{12}H_{17}O_4N_2P$ (molecular weight 248.2). Psilocybin is an amphoteric compound. It is optically inactive and readily soluble in dilute aqueous mineral acids and in dilute aqueous alkalis with which it forms salts. A solution of psilocybin in 80% (by weight) aqueous ethanol has a faintly acid reaction (pH 5.2). The UV-spectrum in a methanolic solution shows maxima at 222, 267 and 290 m$\mu$.

For analysis, the psilocin is purified by another chromatographic operation on a column of cellulose powder, using water-saturated butanol or by treatment with potassium bicarbonate in an aqueous solution and extraction with ether or an organic solvent. The results of elementary analysis give the empirical formula $C_{12}H_{16}NO_2$. Psilocin crystallizes from methanol or acetone; it is moderately soluble in water but dissolves readily in dilute acid. M.P. 173–176° C. (with decomposition).

Psilocin is characterized by an UV-spectrum in a methanolic solution with maxima at 222, 260, 267, 283 and 293 m$\mu$ and by the Keller color reaction which shows —unlike psilocybin—a clear blue color.

Psilocybin is the phosphoric acid ester of psilocyn, 4 - hydroxy - dimethyl - tryptamine (Experientia, vol. 14, 1958, pages 397–399).

The products of the present invention are psychotropically active and find use in therapy as tranquilizers. Subcutaneous injection or oral administration of 2 to 8 mg. of psilocybin produces a pronounced euphoric mood accompanied by a lack of spontaneity and a feeling of indifference. When administered in higher dosage, there occur changes in perception together with automatic symptoms. Both psilocin and psilocybin are useful for research into mental disease and psychoses. They are also useful as an aid to psychotherapy in mental patients (tranquilization, anxiety repressing, etc.).

In the following illustrative examples, parts by weight bear the same relationship to parts by volume as do grams to milliliters. Percentages are by weight. Temperatures are in degrees centigrade.

EXAMPLE 1

*Psilocybin and psilocin from fruit bodies of* Psiloybe mexicana *Heim obtained by artificial cultivation*

For cultivation on a natural substrate a compost of fermented wheat straw is prepared, washed thoroughly with running water, poured into earthenware pots and sterilized in the autoclave. The compost is inoculated with mycelium from primary cultures of *Psilocybe mexicana* Heim and incubated for approx. two weeks at 24–27°. The cultures are then covered with sterile sand and left in a glass case at a temperature of 21–22° in the daylight. After 4 to 5 weeks the fruit bodies appear; when the spores are beginning to form, the fruit bodies are gathered from time to time over a period of 1 to 2 months. The ripe fruit bodies of *Psilocybe mexicana* Heim are then carefully dried in an air current at 30°. 54 parts by weight of the dried fungi are finely powdered and extracted once with 600 parts by volume and three times with 300 parts by volume of methanol for 30 minutes each time. The extracts are combined and evaporated to dryness in vacuo. Residue: 12 parts by weight.

To defat the methanol residue, it is rubbed four times with 250 parts by volume of petroleum ether and three times with 100 parts by volume of chloroform containing 10% of ethanol. The undissolved residue of approx. 10 parts by weight is dissolved in 10 parts by volume of water and the solution is mixed gradually with 100 parts by volume of absolute ethanol. The amount of active substance in the solution is thereby increased. This operation is repeated two or three times. The solutions are decanted off and evaporated to dryness under reduced pressure; the residue is again dissolved in methanol and the solution treated with 20 parts by weight of cellulose powder containing 5% of water. The methanol is evaporated off under reduced pressure and the cellulose powder bearing the active material is poured onto a column of 100 parts by weight of cellulose powder containing 5% of water, the column having previously been washed with water-saturated butanol. The column is eluted with water-saturated butanol and fractions of 20 parts by volume are collected. The evaporation residues from the individual fractions are tested for their content of active material by means of the Keller color reaction. For this purpose, 2 milliliters of Keller reagent are added to samples of 0.25 milligram of evaporation residue.

The fractions showing a positive color reaction are combined. The amorphous powder is dissolved in 20 parts by volume of water and shaken with 0.5 part by weight of silver carbonate. The solution is filtered and desilverized with hydrogen sulphide and then carefully concentrated. Psilocybin crystallizes from the concentrated solution in the form of fine colorless needles (yield 200 parts by weight).

Psilocin is obtained only in trace amounts from the fruit bodies.

Psilocybin is obtained in an analytically pure state by a further recrystallization from methanol or water. It dissolves boiling methanol or in water at the boiling point. Colorless prisms are obtained from methanol which melt at 195–220° (with decomposition).

The results of elementary analysis give the empirical formula $C_{12}H_{17}O_4N_2P$. The UV-spectrum in a methanolic solution shows the following maxima: 222 m$\mu$, 267 m$\mu$ and 290 m$\mu$.

The new substance is amophoteric. It dissolves to form salts in diluted aqueous alkalis as well as in aqueous acids. A solution of psilocybin in 80% aqueous alcohol has an acid reaction (pH 5.2).

EXAMPLE 2

*Obtaining psilocybin and psilocin from* Stropharia cubensis *Earle obtained by artificial cultivation*

The fruit bodies of *Stropharia cubensis* Earle collected in Mexico are carefully dried at room temperature in a shady place in the air. 24.2 parts by weight of dried fruit bodies are thoroughly ground and extracted once with 300 parts by volume and then three times with 150 parts by volume of methanol, each time at room temperature for 30 minutes. The extracts are combined and evaporated to dryness under reduced pressure. The residue (6 parts by weight) is defatted by rubbing well four times with 125 parts by volume of petroleum ether and three more times with 50 parts by volume of chloroform each time, the chloroform containing 10% of ethanol. The undissolved residue (59 parts by weight) is dissolved in 5 parts by volume of water. From this solution other products are precipitated by slowly adding 50 parts by volume of absolute ethanol so that the active substance accumulates in the solution. The purification is repeated two or three times in the same manner. The decanted solutions are combined and evaporated to dryness in vacuo. The residue is taken up in methanol and treated with 10 parts by weight of cellulose powder containing 5% of water. The methanol is evaporated off under reduced pressure and the cellulose powder bearing the active substance is poured onto a column of 50 parts by weight of cellulose powder containing 5% of water, the column having previously been washed with water-saturated butanol. After extraction with water-saturated butanol, fractions of 10 parts by volume are collected. The individual fractions are evaporated in a high vacuum at a maximum bath temperature of 50° and are tested for their content of active material by means of glacial acetic acid containing ferric chloride and concentrated sulphuric acid. For this purpose, 2 milliliters of Keller reagent are added to samples of 0.25 milligram of the residue. The active fractions are characterized by a violet (psilocybin) or a clear blue (psilocin) Keller reaction.

The fractions showing a positive color reaction of the same shade are combined. The amorphous powder of the above evaporation residues is dissolved in 2 parts by volume of water and extracted with 0.25 part by weight of silver carbonate. After filtering, the excess of silver ions is removed with hydrogen sulphide. Upon carefully concentrating the solution, the psilocybin crystallizes as thin colorless needles.

EXAMPLE 3

*Obtaining psilocybin and psilocin from pure cultures of Psilocybe semperviva Heim and Cailleux*

(a) *Preparing the inoculation material.*—Pure cultures of the basidiospores of the Mexican fungus *Psilocybe semperviva* Heim and Cailleux are grown on beerwort-agar. For this purpose, the spores falling from the lamellae of a ripe fruit body are collected on sterile material, placed on beerwort-agar and incubated. From the primary cultures so produced the inoculation material is prepared in the following manner in sufficient amount:

The mycelium is scraped off with a rough spatula, a suspension of fine mycelium flakes being formed. This suspension is used to inoculate flasks containing a culture medium and saddle-shaped porcelain filler bodies such as are used for filling distillation columns.

The best results are obtained with 300 milliliter flasks containing about 50 saddle-shaped fillers (size 1 cm., weight approx. 0.9 gram) and 80 milliliters of a culture medium consisting of beerwort containing approx. 4% of dry substance and 0.2% of agar. The culture is incubated at a temperature of 24°. After 2 weeks a compact mycelium layer has formed on the surface. The whole culture is shaken for 30 minutes on the rotating shaking machine, the sharp edges of the saddle-shaped fillers grinding the mycelium so that a fine suspension of mycelium flakes is formed. The inoculation material so obtained is sufficient to inoculate 50 liters of culture medium.

(b) *Preparation of culture.*—Fresh and clear beerwort, without hops, is diluted with tap water to a content of 8% of dry substance. To each litre of this solution there are added:

| | Grams |
|---|---|
| $FeSO_4 \cdot 7H_2O$ | 0.00417 |
| $ZnSO_4 \cdot 7H_2O$ | 0.00172 |
| $Ca(NO_3)_2$ | 1.0 |
| $KH_2PO_4$ | 0.0624 |
| $MgSO_4 \cdot 7H_2O$ | 0.0624 |
| KCl | 0.0312 |
| Agar-agar | 2.0 |

This culture medium is poured into penicillin flasks and the latter are then sterilized in the autoclave at 108° for 25 minutes. On cooling, the flasks are each inoculated with 2 milliliters of a suspension of *Psilocybe semperviva* Heim and Cailleux. The cultures so obtained are incubated in the dark at 24–26°, the mycelium layer described under 3(a) thus being formed.

(c) *Isolation of the fungal mataerial.*—After 7 weeks the ripe culture is filtered through a gauze tissue, the fungal material is squeezed out and dried in vacuo at 30°. 2540 grams of dry material, i.e. 25.4 grams per liter of culture medium are obtained after 49 days from a batch of 100 penicillin flasks containing 100 liters of culture medium. The culture filtrate containing active material is worked up according to the procedure described in the following paragraph for the fungal material.

(d) *Obtaining the active material.*—306 parts by weight of the dried fungal material are finely powdered and shaken 3 times with 500 parts by volume of chloroform each time and 3 more times with 500 parts by volume of chloroform containing 10% of ethanol. 2.8 parts by weight of inactive accompanying substance are thereby dissolved. The pre-extracted fungal material is thoroughly extracted once with 3000 parts by volume and 3 times with 1500 parts by volume of methanol each time. The combined extracts are evaporated to dryness under reduced pressure, a clear brown residue of 17.5 parts by weight remaining. In order to remove fatty impurities from this residue, it is taken up in 17.5 parts by weight of water and the suspension is extracted once with 500 parts by volume and twice with 250 parts by volume of petroleum ether each time. The petroleum ether solution contains 0.75 part by weight of inactive accompanying material. The residual aqueous solution is concentrated under reduced pressure to about 25 parts by volume and is then treated with 250 parts by volume of absolute ethanol, while being vigorously stirred. From the sticky precipitate so produced, the solution containing active material is separated by decantation. The precipitate is re-dissolved in a little water and treated with a tenfold quantity of absolute ethanol. This purification by precipitation is repeated twice with the residue. The solutions are combined and evaporated to dryness in vacuo. There remains a solid residue of 11.7 parts by weight containing the whole amount of active material.

For chromatography on a column of cellulose, the residue is dissolved in as little of 50% methanol as possible. The solution is mixed well with 40 parts by weight of cellulose powder and the material is dried under reduced pressure. The cellulose powder bearing the active substance is poured onto a column of cellulose prepared by suspending 350 parts by weight of cellulose powder in water-saturated butanol. The column is developed in a through-flow process with water-saturated butanol, fractions of 100 parts by volume each being thereby separated and then concentrated under a high vacuum at a bath temperature not exceeding 50°. The intermediate fractions (3.35 parts by weight) show a positive Keller color reaction and are chromatographed again in the same way for further purification.

Fractions of 50 parts by volume each are obtained by developing with water-saturated butanol and, after evaporation in a high vacuum at a bath temperature not exceeding 50°, are tested by means of the Keller color reaction. The fractions obtained are as follows:

| Fraction No. | Residue, parts by weight | Keller color reaction |
|---|---|---|
| 1–7 | 1.27 | Negative. |
| 8–16 | 0.087 | Clear blue. |
| 17–20 | 0.079 | Negative. |
| 21–30 | 1.053 | Violet. |
| 31–43 | 0.758 | Negative. |

Upon treatment with silver carbonate, the residue of fractions 8–16 yields 0.045 part by weight of pure psilocin as described in Example 2. Fractions 21–30 yield 0.765 part by weight of pure psilocybin after treatment with silver carbonate.

The active material is obtained from the culture filtrate by the same process. For this purpose, the filtrate is concentrated in vacuo to approximately 1/10 of its volume. It is then precipitated with a tenfold volume of methanol and filtered off from the precipitated accompanying material. The solution is evaporated to dryness in vacuo and the residue is extracted 3 times with a tenfold amount of methanol. The evaporation residue of the methanol extracts is worked up as described above. 80 milligrams of psilocybin and 6 milligrams of psilocin are obtained from each 12 liters of culture filtrate.

EXAMPLE 4

*Obtaining psilocybin and psilocin from pure cultures of Psilocybe mexicana Heim*

In this example a detailed description is given of the cultivation of *Psilocybe mexicana* Heim in vitro for the production of mycelium and sclerotes as well as of the method of obtaining the pure active material.

Fresh and clear beerwort, without hops, is diluted with tap water to a content of 4.0–4.5% of dry substance. To this solution there are added:

| | Grams |
|---|---|
| $FeSO_4.7H_2O$ | 0.00417 |
| $ZnSO_4.7H_2O$ | 0.00172 |
| Agar-agar | 2.0 |

500 milliliter portions of this culture medium are poured into 1.6-liter Fernbach flasks and the latter are then sterilized in the autoclave at 108° for 25 minutes. On cooling, the flasks are each inoculated with 2 milliliters of a suspension of the fungus *Psilocybe mexicana* Heim. The inoculation material is prepared by growing pure cultures of basidio-spores of the said fungus on beerwort-agar. The spores falling from the lamellae of a ripe fruit body are collected on sterile material, placed on beerwort-agar and incubated. From the primary cultures so produced the inoculation material may be prepared in the following manner:

The mycelium is scraped off with a rough spatula under a stream of sterile tap water. In this way a suspension of fine mycelium flakes is obtained. This suspension is used to inoculate Erlenmeyer flasks containing a culture medium and saddle-shaped porcelain fillers. The best results are obtained with 300 milliliter Erlenmeyer flasks containing a 50 gram saddle-shaped filler (size 1 cm., weight approximately 0.9 gram) and 80 milliliters of a culture medium consisting of beerwort containing approximately 4% of dry substance and 2% of agar. The culture is incubated at a temperature of 24°; after 2 weeks a compact mycelium layer has formed on the surface. The whole culture is shaken for 30 minutes on the rotating shaking machine, the saddle-shaped fillers grinding the mycelium so that a fine suspension of mycelium flakes is formed. The inoculation material so obtained is sufficient to inoculate 25 liters of culture medium. The inoculated cultures are incubated at 24–26° in the dark. A mycelium layer bearing many sclerotes is formed, the sclerotes in general reaching a size of 1 cm. (some of them may grow even larger). In order to separate the mycelium and the sclerotes, the ripe cultures are filtered through a gauze tissue, squeezed out and dried in a drying oven at 35–40°. 1149 grams of dry material (sclerotes and mycelium), i.e. 17.15 grams per liter of culture medium are obtained after 62 days from a batch of 134 Fernbach flasks containing 67 liters of nutrient solution.

The active material can be obtained as follows: 612 parts by weight of dry substance consisting of dried sclerotes and mycelium are finely pulverized and pre-extracted three times with 1000 parts by volume portions of chloroform and three times with 1000 parts by volume portions of chloroform containing 10% of ethanol. 5.6 parts by weight of inactive accompanying material are thus pre-extracted. The pre-extracted fungal material is then extracted thoroughly once with 6000 parts of volume and three more times with 3000 parts by volume of methanol. The combined methanol extracts are evaporated to dryness under reduced pressure to give 35 parts by weight of a clear brown residue. In order to remove fatty impurities from this residue, it is washed in 35 parts by volume of water and shaken once with 1000 parts by volume and twice with 500 parts by volume of petroleum ether. The petroleum ether contains 1.5 parts by weight of inactive accompanying substance. The remaining aqueous solution is first concentrated under reduced pressure to approx. 50 parts by volume and is then treated with 500 parts by volume of absolute ethanol with vigorous stirring. From the sticky precipitate so produced, the solution containing active material is separated by decantation. The precipitate is redissolved in a little water and treated with a tenfold amount of absolute alcohol. This purification by precipitation is repeated twice with the residue. The solutions are combined and evaporated to dryness under reduced pressure. There remains a solid residue of 23.4 parts by weight containing the whole amount of active material.

For chromatography on a column of cellulose, the residue is dissolved in as little of 50% methanol as possible. The solution is mixed well with 80 parts by weight of cellulose powder and the material is dried under reduced pressure. The cellulose powder bearing the active substance is poured onto a column of cellulose prepared by suspending 700 parts by weight of cellulose powder in water-saturated butanol. The column is developed in a through-flow process with water-saturated butanol, fractions of 200 parts by volume being thereby separated and then concentrated under a high vacuum at a bath temperature not exceeding 50°. The fractions obtained are as follows:

TABLE 1

| Fraction No. | Residue, parts by weight | Keller color reaction |
|---|---|---|
| 1–14 | 2.170 | Negative. |
| 15–34 | 6.660 | Positive. |
| 35–40 | 3.540 | Negative. |
| | 12.370 | |

Approx. 11 parts by weight remain in the column.

Fractions 15 to 34 yield a residue of 6.660 parts by weight and contain the whole amount of active substance. They are chromatographed again as described below for further purification. The residue of 6.660 parts by weight is dissolved in as little methanol as possible and is then used to impregnate 20 parts by weight of cellulose powder. After drying, the cellulose powder is poured onto a column of 600 parts by weight of cellulose powder which has been treated as described above. Fractions of 100 parts by volume each are obtained by developing with water-saturated butanol and, after evaporation in a high vacuum, are tested by means of a color reaction. The fractions obtained are as follows:

TABLE 2

| Fraction No. | Residue, parts by weight | Keller color reaction |
|---|---|---|
| 1–8 | 2.950 | Negative. |
| 9–17 | 0.180 | Clear blue. |
| 18–21 | 0.155 | Negative. |
| 22–31 | 0.912 | Violet. |
| 32–45 | 1.510 | Negative. |

The residue from fractions 9–17 yields 0.090 part by weight of pure psilocin after treatment with silver carbonate as described in Example 1. After treatment with silver carbonate as described in Example 1, fractions 22–31 (Table 2) yield 0.619 part by weight of pure psilocybin having the properties described in Example 1. The active material is obtained from the culture filtrate by the same process as described above for the sclerotes. For this purpose the culture filtrate is concentrated under reduced pressure to approx. 1/10 of its volume. After precipitation with a tenfold volume of methanol and subsequent filtration, the residue is extracted three times with a tenfold amount of methanol. The evaporation residue of the methanol extracts is worked up as described above. From every 10 litres of culture filtrate 220 milligrams of psilocybin and 12 milligrams of psilocin are obtained.

EXAMPLE 5

*Psilocybin and psilocin from pure cultures of* Stropharia cubensis *Earle*

A culture medium is prepared as follows: Fresh and clear beerwort, without hops, is diluted with tap water to a content of 6% of dry substance. To each litre of this solution there are added:

| | Grams |
|---|---|
| $FeSO_4 \cdot 7H_2O$ | 0.0021 |
| $ZnSO_4 \cdot 7H_2O$ | 0.0009 |
| $Ca(NO_3)_2$ | 1.0 |
| $KH_2PO_4$ | 0.0624 |
| $MgSO_4 \cdot 7H_2O$ | 0.0624 |
| KCl | 0.0312 |
| Agar-agar | 2.0 |

This culture medium is sterilized as described in Example 3 and inoculated with 2 milliliters of a suspension of the fungus Stropharia cubensis Earle (from Kambodscha) per litre of nutrient solution. The inoculation material is prepared as described in Example 3(a). After incubation for 52 days at 24° in the dark, there are obtained 452 grams of dried fungal material, i.e. 22.6 grams per litre from a batch of 20 litres. The active substance is obtained from the fungal material in the manner described in Example 3. Yield: 1083 milligrams of pure crystalline psilocybin and 45 milligrams of psilocin.

EXAMPLE 6

*Psilocybin and psilocin from fruit bodies of* Psilocybe semperviva *Heim and Cailleux of natural origin*

Ripe fruit bodies of the fungus *Psilocybe semperviva* Heim and Cailleux obtained from artificial cultures on a natural medium are carefully dried in an air current at 30°. 32 parts by weight of the dried fruit bodies are finely ground and shaken for 30 minutes at room temperature once with 300 parts by volume and three times with 150 parts by volume of methanol each time. The combined extracts are evaporated to dryness under reduced pressure. To remove the fat, the residue (8.3 parts by weight) is rubbed 4 times with 125 parts by volume of petroleum ether each time and three times with 50 parts by volume of chloroform containing 10% of ethanol. The residual 6.5 parts by weight are dissolved in 6 parts by volume of water and, in order to precipitate other substances, the solution is slowly treated with 60 parts by volume of absolute ethanol; the amount of active substance in the solution is thereby increased. The purification is repeated twice in the same manner. The solutions are decanted, combined and evaporated to dryness under reduced pressure. The residue is taken up in methanol and chromatographed on cellulose powder as described in Example 2. From the active material so obtained, the halogen is removed by treatment with silver carbonate. After recrystallization there are obtained 0.160 part by weight of crystalline psilocybin and 0.032 part by weight of psilocin.

EXAMPLE 7

*Psilocybin from fruit bodies of* Psilocybe caerulescens *Murrill Var.* mazatecorum *Heim obtained by Artificial cultivation*

Ripe fruit bodies of the fungus *Psilocybe caerulescens* Murrill var. *mazatecorum* Heim obtained from artificial cultures on a natural medium are carefully dried. The dried fungal material (7.3 parts by weight) is finely ground and extracted thoroughly with methanol as described in Example 2. The extracts are combined and evaporated to dryness under reduced pressure. The residue is worked up as described in Example 2. There is obtained 0.0146 part of pure psilocybin.

EXAMPLE 8

*Psilocybin from pure cultures of* Psilocybe Caerulescens *Murrill var.* mazatecorum *Heim*

A culture medium is prepared as follows: Fresh and clear beerwort, without hops, is diluted with tap water to a content of 4% of dry substance. To each litre of this solution there are added:

| | Grams |
|---|---|
| "Cornsteep solids" | 10.0 |
| $FeSO_4 \cdot 7H_2O$ | 0.00834 |
| $Ca(OH)_2$ | 0.20 |
| $K_2HPO_4$ | 0.20 |
| $NH_4OH$ | 0.25 |
| Agar-agar | 2.0 | pH of the solution: 5.4.

This culture medium is sterilized as described in Example 3 and inoculated with a mycelium suspension prepared from a pure culture of the fungus *Psilocybe caerulescens* Murrill var. *mazatecorum* Heim (from Mexico). The cultures so obtained are incubated at 26° in the dark. After 48 days there are obtained 20.4 grams of dried fungal material per litre of nutrient solution. The active substance is isolated and purified as described in Example 3. A batch of 10 litres of culture medium yields 449 milligrams of psilocybin.

EXAMPLE 9

*Psilocybin from* Psilocybe zapotecorum *Heim of natural origin*

Ripe fruit bodies of the fungus *Psilocybe zapotecorum* Heim (collected in the "pays chatino" in Mexico) are carefully dried (residue 42.4 grams), finely ground and extracted with methanol as described in Example 2. The combined methanol extracts are evaporated to dryness under reduced pressure and the residue is worked up as described in Example 2. There are obtained 212 mg. of pure psilocybin.

EXAMPLE 10

*Psilocybin from pure cultures of* Psilocybe zapotecorum *Heim*

Fresh and clear beerwort, without hops, is diluted with tap water to a content of dry susbtance of 4.5%. To each litre of this solution there are added:

| | Grams |
|---|---|
| $FeSO_4$ | 0.00834 |
| "Cornsteep solids" | 10.0 |
| $NH_4OH$ | 0.30 |
| $K_2HPO$ | 0.30 |
| Agar-agar | 2.0 | pH of the solution: 5.5.

This culture medium is sterilized as described in Example 3 and inoculated with a mycelium suspension of a pure culture obtained from spores of ripe fruit bodies of the fungus *Psilocybe Zapotecorum* Heim (from the "pays chatino" in Mexico). After incubation for 57 days at 24° in the dark, there are obtained 430 grams of dried fungal material, i.e. 17.2 grams per litre from a batch of 25 litres. The active substance is obtained by the process described in Example 3. Yield: 903 milligrams of pure psilocybin.

EXAMPLE 11

*Psilocybin and psilocin from* Psilocybe aztecorum *Heim of natural origin*

Ripe fruit bodies of the fungus *Psilocybe aztecorum* Heim (collected in Mexico in the region of the Aztecs, on Mt. Popocatepetl at an altitude of 10,800 to 11,500 feet) are carefully dried, finely ground and extracted thoroughly with methanol as described in Example 2. The extracts are combined and evaporated to dryness under reduced pressure. The residue is worked up as described in Example 2. There are obtained 570 milligrams of pure psilocybin and 47 milligrams of psilocin.

EXAMPLE 12

*Psilocybin and psilocin from pure cultures of* Psilocybe aztecorum *Heim*

A culture medium is prepared as follows:

| | Grams |
|---|---|
| Malt extract | 100 |
| $FeSO_4 \cdot 7H_2O$ | 0.00417 |
| $ZnSO_4 \cdot 7H_2O$ | 0.00172 |
| $Ca(NO_3)_2$ | 1.0 |
| $KH_2PO_4$ | 0.25 |
| $MgSO_4 \cdot 7H_2O$ | 0.25 |
| KCl | 0.125 |
| Agar-agar | 2.0 |
| Tap water up to 1000 milliliters. | |

This culture medium is sterilized in an autoclave at 108° for 25 minutes. 1 litre of the nutrient solution is inoculated with 2 milliliters of a suspension of the fungus *Psilocybe aztecorum* Heim. The inoculation material is prepared as described in Example 3(a). The cultures are incubated for 45 days at 24° in the dark and then harvested as described in Example 3(c). Yield from 10 litres of culture medium: 86.5 grams of dried mycelium.

86.5 parts by weight of finely ground mycelium is shaken out at room temperature for 30 minutes with 1000 parts by volume of 80% aqueous ethanol. After filtration, the residue is extracted three more times in the same way. To remove the fatty accompanying products and inactive ballast material, the evaporation residue of the combined extracts is successively extracted twice with 100 parts by volume of petroleum ether, twice with 80 parts by volume of chloroform and twice with 50 parts by volume of acetone. There remain 5.6 parts by weight of a water-soluble powder which are dissolved in 6 parts by volume of water. 60 parts by volume of acetone are slowly added, while stirring vigorously. The precipitate thus obtained is separated, dissolved once more in a little water and precipitated again with a tenfold quantity of acetone. This purification by precipitation is repeated twice with the share not soluble in acetone, the whole amount of active material passing over into the aqueous acetone extracts. The extracts are evaporated in vacuo and the residue (2.8 parts by weight) is further purified by chromatography on a column of cellulose powder as described in Example 3.

After double chromatography, there are obtained 0.225 part by weight of crystalline psilocybin and 0.015 part by weight of psilocin.

EXAMPLE 13

A culture medium is prepared as follows: Fresh and clear beerwort, without hops, is diluted with tap water to a content of dry material of 4.0 to 4.5%. To each litre of this solution there are added:

| | Grams |
|---|---|
| $FeSO_4 \cdot 7H_2O$ | 0.00209 |
| $ZnSO_4 \cdot 7H_2O$ | 0.0086 |
| $Ca(NO_3)_2$ | 0.25 |
| $KH_2PO_4$ | 0.0625 |
| $MgSO_4$ | 0.0625 |
| KCl | 0.031 |
| Agar-agar | 2.0 |

This culture medium is sterilized and inoculated as described in Example 4. After incubation at 24° for 48 days, there is obtained a yield of 924 grams of sclerotes and mycelium (dried material), i.e. 16.6 grams per litre, from a batch of 55 litres. The active material—psilocin and psilocybin—may be obtained therefrom as described in Example 4.

EXAMPLE 14

A culture medium is prepared as follows: Fresh and clear beerwort, without hops, is diluted with tap water to a content of dry material of 4.0 to 4.5%. To each litre of this solution there are added:

| | Grams |
|---|---|
| $FeSO_4 \cdot 7H_2O$ | 0.00209 |
| $ZnSO_4 \cdot 7H_2O$ | 0.00086 |
| $Ca(NO_3)_2$ | 1.0 |
| Agar-agar | 2.0 |

This culture medium is sterilized, inoculated and incubated as described in Example 4. After 48 days there are obtained 20.5 grams of dried sclerotes and mycelium per litre of culture medium. The active material—psilocin and psilocybin—is isolated as described in Example 4.

EXAMPLE 15

A culture medium is prepared as follows: Fresh and clear beerwort, without hops, is diluted with tap water to a content of dry material of 4.0 to 4.5%. To each litre of this solution there are added:

| | Grams |
|---|---|
| $FeSO_4 \cdot 7H_2O$ | 0.00209 |
| $ZnSO_4 \cdot 7H_2O$ | 0.00086 |
| $KH_2PO_4$ | 0.25 |
| Agar-agar | 2.0 |

This culture medium is worked up as described in Example 4. After 48 days there is obtained a yield of 15.9 grams of dried sclerotes and mycelium per litre of nutrient solution. The active material—psilocin and psilocybin—is isolated as described in Example 4.

EXAMPLE 16

A culture medium is prepared as follows: Fresh and clear beerwort, without hops, is diluted with tap water to a content of dry material of 4.0 to 4.5%. To each litre of this solution there are added:

| | Grams |
|---|---|
| $FeSO_4 \cdot 7H_2O$ | 0.00209 |
| $ZnSO_4 \cdot 7H_2O$ | 0.00086 |
| "Cornsteep solids" | 20.0 |
| Agar-agar | 2.0 |

This culture medium is sterilized, inoculated and incubated as described in Example 4. After 48 days there is obtained a yield of 29.8 grams of dried sclerotes and mycelium per litre of nutrient solution. The active material—psilocin and psilocybin—is isolated as described in Example 4.

EXAMPLE 17

A culture medium is prepared as follows:

| | Grams |
|---|---|
| Malt extract | 45 |
| $FeSO_4 \cdot 7H_2O$ | 0.00417 |
| $ZnSO_4 \cdot 7H_2O$ | 0.00172 |
| Tap water up to 1000 milliliters. | |

This culture medium is sterilized at 108° for 25 minutes in an autoclave. 1 litre of the nutrient solution is inoculated with 10 milliliters of a suspension of the fungus *Psilocybe mexicana*. The inoculation material is prepared as described in Example 4. After inoculation, the fungus is cultured in this nutrient solution at 24° using an agitated submersion procedure. There are formed sago-like mycelium balls. After 30 days the mycelium is separated by filtration and yields 7.0 grams of dry mycelium per litre of culture medium.

430 parts by weight of dried and finely ground mycelium are shaken for 30 minutes with 4500 parts by volume of 80% aqueous ethanol at room temperature. After filtering off the residue, it is extracted three more times in the same manner. To remove ballast material, the evaporation residue of the combined extracts (41 parts by weight) is successively extracted twice with 500 parts by volume of petroleum ether, twice with 400 parts by volume of chloroform and two more times with 200 parts by volume of acetone. There remain 25 parts by weight of a water-soluble powder, which are dissolved in 25 parts by volume of water. 250 parts by volume of acetone are slowly added, while stirring vigorously. The liquid is then separated from the precipitate, the latter is redissolved in a little water and precipitated again with a tenfold quantity of acetone. This operation is repeated twice with the part not soluble in acetone, all the active material passing over into the aqueous acetone extracts. The extracts are evaporated with vigorous stirring and the residue (9.8 parts by weight is further purified by chromatography on a cellulose column as described in Example 4.

After chromatographing twice, there are obtained 0.032 part by weight of crystalline psilocin and 0.225 part by weight of psilocybin.

While in the preceding illustrative examples methanol alone is exemplified as the extracting agent, other aliphatic alcohols such as ethanol, propanol and isopropanol can also be used in like manner and with equal success.

What is claimed is:

1. A process for obtaining the psychotropically active compounds psilocybin and psilocin, which comprises extracting the active principles from fungal material of one of the species *Psilocybe mexicana* Heim, *Stropharia cubensis* Earle, *Psilocybe semperviva* Heim and Cailleux, *Psilocybe caerulescens* Murrill var. *mazatecorum* Heim, *Psilocybe zapotecorum* Heim, *Psilocybe aztecorum* heim and *Psilocybe caerulescens* Murrill var. *nigripes* Heim, by means of the extractant action on said material of a water-miscible organic solvent for such active principles said solvent being selected from the group consisting of water, lower aliphatic alcohol, and a mixture of water and lower aliphatic alcohol, severally isolating the active principles from the resulting extract, and treating the so-obtained material with a silver ions-yielding halogen-acceptor and thus freeing the material of halogen, whereby the compounds psilocybin and psilocin and obtained; the compound psilocybin having the empirical formula $$C_{12}H_{17}O_4N_2P$$

being recrystallizable from water as fine white needles and from methanol as colorless hexagonal crystals containing crystallization-methanol and melting at 195–200° C. with decomposition, being optically inactive, amphoteric and soluble in dilute aqueous mineral acids and in dilute aqueous alkalis, and being characterized in methanolic solution by a UV-spectrum shown maxima at 222, 267 and 290 mμ; and the compound psilocin having the empirical formula $C_{12}H_{16}NO_2$, melting at 173–176° C. with decomposition, and being characterized by a clear blue Keller color reaction and in methanolic solution by a UV-spectrum showing maxima at 222, 260, 267, 283 and 293 mμ.

2. A process according to claim 1, wherein the fungal material being extracted is natural fungal material.

3. A process according to claim 2, wherein the extractant is a lower aliphatic alcohol.

4. A process according to claim 3, wherein the natural fungal material is *Psilocybe mexicana* Heim.

5. A process according to claim 3, wherein the natural fungal material is *Stropharia cubensis* Earle.

6. A process according to claim 3, wherein the natural fungal material is *Psilocybe semperviva* Heim and Cailleux.

7. A process according to claim 3, wherein the natural fungal material is *Psilocybe caerulescens* Murrill var. *mazatecorum* Heim.

8. A process according to claim 3, wherein the natural fungal material is *Psilocybe zapotecorum* Heim.

9. A process according to claim 3, wherein the natural fungal material is *Psilocybe aztecorum* Heim.

10. A process according to claim 3, wherein the fungal material is in the form of fruit bodies which have been cultured on a natural substrate and the cultures have been incubated at a constant temperature between 18 and 27° C.

11. A process according to claim 1, wherein the fungal material being extracted is artificially cultured material obtained from cultures of a fungus selected from the group consisting of *Psilocybe mexicana* Heim, *Stropharia cubensis* Earle, *Psilocybe semperviva* Heim and Cailleux, *Psilocybe caerulescens* Murrill var. *mazatecorum* Heim, *Psilocybe zapotecorum* Heim, *Psilocybe aztecorum* Heim and *Psilocybe caerulescens* Murrill var. *nigripes* Heim and biological mutants and variants thereof by inoculating a substrate with said fungus and incubating the cultures at a constant temperature between 18 and 27° C.

12. A process according to claim 11, wherein the extractant is a lower aliphatic alcohol.

13. A process according to claim 12, wherein the fungus is *Psilocybe mexicana* Heim.

14. A process according to claim 12, wherein the fungus is *Stropharia cubensis* Earle.

15. A process according to claim 12, wherein the fungus is *Psilocybe semperviva* Heim and Cailleux.

16. A process according to claim 12, wherein the fungus is *Psilocybe caerulescens* Murrill var. *mazatecorum* Heim.

17. A process according to claim 12, wherein the fungus is *Psilocybe Zapotecorum* Heim.

18. A process according to claim 12, wherein the fungus is *Psilocybe Aztecorum* Heim.

19. A process according to claim 12, wherein the fungus is cultured in vitro on an artificial substrate of a 4 to 10% concentration of dry malt extract, 0.0004 to 0.0010 gram of iron(II) ions and 2 grams of agar-agar being added per liter of nutrient solution employed, and the culture being incubated in the dark.

20. A process according to claim 1, wherein the halogen-acceptor is silver oxide.

21. A process according to claim 1, wherein the halogen-acceptor is silver carbonate.

References Cited by the Examiner

UNITED STATES PATENTS

| | | | |
|---|---|---|---|
| 1,632,312 | 6/27 | Raeth | 195—80 |
| 2,422,230 | 6/47 | Foster et al. | 195—80 |
| 2,825,734 | 3/58 | Speeter | 260—319 |
| 2,850,518 | 9/58 | Gaertner | 260—319 |
| 2,850,520 | 9/58 | Merian | 260—319 |
| 2,955,073 | 10/60 | De Beer | 167—65 |
| 2,997,422 | 8/61 | Tedeschi | 167—65 |

OTHER REFERENCES

Wilkins: Annals Appl. Biol., vol. 31, No. 4, 1944, pp. 261–270.

Balenovic: Archiv. Kem, vol. 27, pp. 15–20 (1955) (obtained thru C.A., vol. 49, 1955, p. 14907f).

Wasson: Mycologia, vol. 50, 1958, pp. 147–148.

Experientia, vol. 14, 1958, pp. 397–399.

Heim et al.: Experientia, 14, pp. 107–109, 1958.

A. LOUIS MONACELL, *Primary Examiner.*

MORRIS O. WOLK, NICHOLAS S. RIZZO,
*Examiners.*